United States Patent
Moorthy et al.

(10) Patent No.: US 7,929,418 B2
(45) Date of Patent: Apr. 19, 2011

(54) DATA PACKET COMMUNICATION PROTOCOL OFFLOAD METHOD AND SYSTEM

(75) Inventors: Srinivasa Moorthy, Tamil Nadu (IN); Krishna Prabhakar Prabhu, Bangalore Karnataka (IN); Lakshminarasimhan Naveenam Padmanabha, Bangalore Karnataka (IN); Rajiv Panday, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 12/052,680

(22) Filed: Mar. 20, 2008

(65) Prior Publication Data
US 2008/0232378 A1 Sep. 25, 2008

(30) Foreign Application Priority Data
Mar. 23, 2007 (IN) .............................. 599/CHE/2007

(51) Int. Cl.
*G01R 31/08* (2006.01)
*H04L 12/28* (2006.01)
*G06F 11/00* (2006.01)

(52) U.S. Cl. .................... 370/216; 370/242; 370/395.52; 714/100

(58) Field of Classification Search ......................... None
See application file for complete search history.

(56) References Cited

U.S. PATENT DOCUMENTS

| | | | | |
|---|---|---|---|---|
| 5,826,041 | A  * | 10/1998 | Ogus | 709/234 |
| 7,114,096 | B2 * | 9/2006 | Freimuth et al. | 714/13 |
| 7,468,985 | B2 * | 12/2008 | Karim et al. | 370/412 |
| 7,480,827 | B2 * | 1/2009 | Callaway et al. | 714/38 |
| 7,552,441 | B2 * | 6/2009 | Lim et al. | 719/312 |
| 2003/0140124 | A1 * | 7/2003 | Burns | 709/220 |
| 2004/0042412 | A1 * | 3/2004 | Fan | 370/252 |
| 2006/0265713 | A1 * | 11/2006 | Depro et al. | 718/104 |
| 2008/0095182 | A1 * | 4/2008 | Elzur et al. | 370/412 |
| 2008/0317017 | A1 * | 12/2008 | Wiemann et al. | 370/389 |
| 2009/0119752 | A1 * | 5/2009 | Chandrashekhar et al. | 726/4 |

* cited by examiner

*Primary Examiner* — Michael J Moore, Jr.
*Assistant Examiner* — Hicham B Foud

(57) ABSTRACT

A computing system, comprising a host computer system, a primary data packet communication protocol (such as TCP/IP) offload engine configured to act as an offload engine for the host computer system, and an alternate data packet communication protocol (such as TCP/IP) offload engine configured to act as an offload engine for the host computer system if the primary offload engine fails. The host computer system, the primary offload engine and the alternate offload engine are in data communication, the primary offload engine is configured to save predefined data packet communication protocol parameters to the host computer system during normal operation, the alternate offload engine is configured to retrieve the parameters from the host computer system if the primary offload engine fails.

12 Claims, 2 Drawing Sheets

DATA PACKET COMMUNICATION PROTOCOL OFFLOAD METHOD AND SYSTEM

RELATED APPLICATIONS

This patent application claims priority to Indian patent application serial no. 599/CHE/2007, having title "Data Packet Communication Protocol Offload Method and System", filed in India on 23 Mar. 2007, commonly assigned herewith, and hereby incorporated by reference.

BACKGROUND OF THE INVENTION

The TCP/IP offload solution offloads the TCP/IP stack functionalities from one or more Host systems (running various applications) to a cluster of offload systems. This moves CPU bandwidth off the Host; that bandwidth is then processed off the Host that hosts the TCP/IP stack. The Host(s) and the TCP/IP offload engines (TOEs) to which the bandwidth is offloaded are connected by a high bandwidth low latency interconnect technology. The TOEs are computing systems that run their own operating systems, which in this dicussion are each assumed to be the Linux OS with a Linux TCP/IP stack.

While the network applications run on the Hosts, the TOEs host the TCP/IP stack and external connectivity to Internet (IP) networks through standard ethernet connectivity. This solution is transparent to the network applications on the Hosts and remote peer entities.

It is possible to have an offload architecture that allows multiple Hosts to share multiple TOEs. This leads to a practical architecture where there is a non-passive TOE, and one also obtains a single IP image for multiple Hosts. However, for the sake of simplicity the following discussion assumes an architecture of a single Host using two TOEs, one TOE acting as primary TOE and the other as alternate TOE. Furthermore, in the following discussion the alternate TOE is assumed to be passive with no data traffic flow on it, while the primary TOE is active.

The implementation of the typical TCP offload solution of the background art involves retaining the socket layer on the Host, and forwarding any further TCP stack processing to the TOE over high speed connectivity. As a part of the solution, specific socket applications on the TOE translate these requests from the Host and make the appropriate socket calls to the TOE TCP/IP stack. The Host connects to and uses only one of the TOEs (primary or alternate) and has the ability to detect failures in a TOE and, in response, switch to the other TOE. As discussed above, it is quite possible for the Host to communicate with multiple TOEs at the same time (each presenting its own TCP/IP stack) and, indeed, a single TOE may act as both primary and alternate TOE (assuming the role of multiple TOEs in a single system). However, reliable fail-over of TCP connections from one TOE to another TOE, while the Host applications continue to use the TCP connections transparently, generally require the arrangement described above of a single HOST, a primary TOE and a (distinct) passive, alternate TOE.

Hosts that offload the TCP/IP stack expect continuous availability of the TCP/IP stack functionality. The TCP/IP stack hosts the TCP connections and other socket parameters, and the failure of a TOE system requires fail-over to an alternate TOE system, without dropping the TCP connections. The applications and the TCP/IP stack do not run on the same CPU, so generally applications should not be affected if one of the TOEs fails. Existing technologies provide fault-tolerance of TCP connections using Ethernet bonding or Ethernet Aggregate, at the Ethernet level. Multiple TCP connection migration solutions have been proposed; these proposed solutions assume application migration and hence provided complex or partial solutions. However, migration solutions assume that the original system is still alive and accessible during the migration, but this assumption is invalid if the original system has failed.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

There will be provided a method for handling the failure of a primary data packet communication protocol offload engine of a host computer system.

In one embodiment, the method comprises an alternate data packet communication protocol (such as TCP/IP) offload engine retrieving predefined data packet communication protocol parameters previously periodically saved to the host computer system by the primary offload engine, the alternate offload engine recreating each socket and data packet communication protocol connection of the primary offload engine, and the alternate offload engine setting up a failed-over data packet communication protocol connection. The method, according to one embodiment, is implemented using instructions, stored on a non-transitory computer readable storage medium, that when executed cause a computing system to perform the method.

There will also be provided a computing system configured to handle the failure of a primary TOE. In one embodiment, the computing system comprises a host computer system, a primary data packet communication protocol offload engine configured to act as an offload engine for the host computer system, and an alternate data packet communication protocol offload engine configured to act as an offload engine for the host computer system if the primary offload engine fails. The host computer system, the primary offload engine and the alternate offload engine are in data communication, the primary offload engine is configured to save predefined data packet communication protocol parameters to the host computer system during normal operation, the alternate offload engine is configured to retrieve the parameters from the host computer system if the primary offload engine fails.

Figure 1:
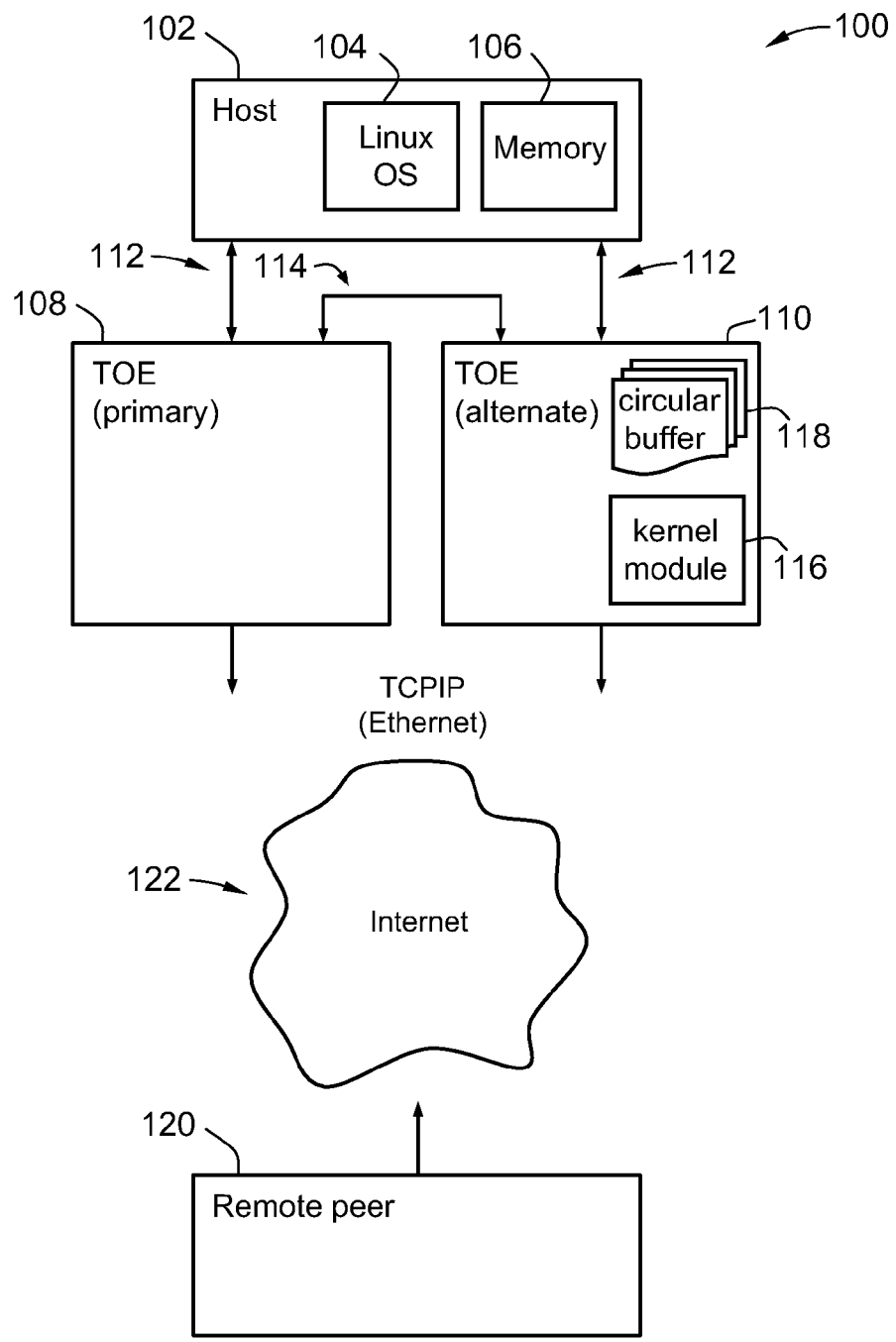
FIG. 1 is a schematic view of a computing system according to an embodiment of the present invention.

FIG. 1 is a schematic view of a computing system 100 according to an embodiment of the present invention, together with a remote peer in data communication with computing system via the Internet. The computing system 100 comprises a Host 102 running a Linux operating system 104 with a Linux stack and having a memory 106, a primary TOE 108 and an alternate TOE 110. It should be noted that, although in this embodiment Host 102 has a Linux operating system, other embodiments may include different operating systems and, indeed, the Host need not have a TCP/IP stack as long as it has a socket layer implementation.

Primary TOE 108 and alternate TOE 110—which are transparent to the remote peer—are Linux systems each with a TCP/IP stack, each connected to the Host 102 by a high-speed link or a Systems Area Network 112 (such as Infiniband or Servernet). The TOEs 108 and 110 are, in this embodiment, hosted on separate systems and connected to each other over an ethernet LAN 114 (though could alternatively be connected to each other via an external network).

It should be appreciated that the TOEs 108 and 110 are referred to as "primary" and "alternative" respectively, but these terms merely indicate the respective roles of the physical TOEs at any particular time. As will be apparent from the following description, these roles swap whenever a fail-over occurs. Thus, the primary TOE 108 is merely whichever physical TOE is acting as TOE at any particular time, and similarly the alternate TOE 110 is whichever physical TOE has the alternate role at any particular time. Both TOEs 108, 110 are thus identical; the functionality of the "primary" TOE 108 is also possessed by the "alternate" TOE 110 (and vice versa), but may be dormant until the alternate TOE 110 assumes the role of primary TOE. In this description, references to "the primary TOE" and to "the TOE" are thus equivalent.

The primary TOE 108 is configured to perform periodically, for each TCP socket connection, a checkpoint of predefined critical TCP parameters, and to transmit these on a real-time basis to Host 102. Host 102 is configured to save these parameters along with other socket data in Host memory 106. These saved parameters enable the restoration of the TCP connection on the alternate TOE 110 when required.

In the event of a fail-over, in which primary TOE 108 fails and its role is to be assumed by alternate TOE 110, alternate TOE 110 retrieves the checkpointed parameters saved to Host memory 106, and the Linux kernel module 116 of the alternate TOE 110 recreates each socket and TCP connection. The Linux kernel module 116 of the alternate TOE 110 understands and modifies the internal socket structures within the Linux Kernel TCP/IP stack (on alternate TOE 110), and sets up a failed-over TCP connection. Alternate TOE 110 thus assumes the role of primary TOE 108.

In addition, to ensure a reliable fail-over of TCP connections, all TCP packets sent by primary TOE 108 to Host 102 are also received by alternate TOE 110 on the ethernet port of the primary TOE 108 via an external networking device or solution. For each TCP connection on the primary TOE 108, the Host 102 instructs the alternate TOE 110 to receive the TCP packets and buffer them. This data is stored in a circular buffer 118 of alternate TOE 110; alternate TOE 110 removes such TCP packets from circular buffer 118 only once Host 102 receives the data, acknowledges to primary TOE 108 that it has received the data, and informs alternate TOE 110 that it may release the TCP packet data from its circular buffer. For example:

ACK value on Primary TOE 102: 1000;
ACK value on Host which corresponds to the latest data received: 1000;
Unacknowledged TCP buffers in primary TOE: 2 (buffer size=512 bytes);
Alternate TOE ACK value seen: 1000 (updated by Host 102);
Host application does a recv data socket operation for 512 bytes;
TCP stack of primary TOE 108 returns 512 bytes to Host 102, updates ACK value to 1512, and sends out a packet to remote peer 120 via the Internet 122; primary TOE 108 deletes 512 bytes buffer from stack; remote peer 120 also deletes 512 bytes from its stack;
New checkpoint information from primary TOE 108 to Host 102 has ACK value as 1512; 512 bytes still in transit; primary TOE 108 fails;
Upon failover, Host 102 informs alternate TOE 110 that ACK value corresponding to data is 1000 (since data was lost in transit) and ACK value is 1512; alternate TOE 110 re-sends the 512 bytes from its kernel buffers to Host 102, then frees the buffer. Host 102 updates the ACK value to 1512 and now is ready for subsequent data transactions.

Thus, the use of buffer 118 ensures that received data is not lost if primary TOE 108 fails after acknowledging the receipt of the packet to the peer, but has not yet forwarded the packet to Host 102. Similarly, the Host's send buffer is kept intact in the Host's socket layer until the peer to which the data is being sent acknowledges receipt and this receipt is received by the Host 102 (via primary TOE 102, while sending the TCP parameters to Host 102).

These features (and others) of the present embodiment are discussed in greater detail below.

Checkpoint Parameters

The number of additional parameters for primary TOE 108 to checkpoint (i.e. periodically ascertain and transmit to Host 102 for storage in memory 106, within its socket structures) are kept to a minimum. The following discusses the various critical parameters, summarises the parameters that are checkpointed.

1) External Perspective—the TCP Peer

All the state information and data, as expected by the TCP Peer, is checkpointed. The following are possible parameters for checkpointing, to satisfy the TCP peer:

TOE's SYN value—The SYN integer value that indicates the pointer value for the next byte to send.
Peer's SYN value—Indicating the pointer value for the byte that the peer has sent.
TOE's ACK value—This follows the peer's SYN value and indicates the pointer value for which the TOE has sent acknowledgement to the peer. The difference between peer's SYN and TOE's ACK shows the unacknowledged data on the TOE.
Peer's ACK value—This follows the TOE's SYN value and indicates the pointer value for which the peer has sent acknowledgment to the TOE. The difference between the TOE's SYN and the peer's ACK shows the unacknowledged data on the peer side.

As the data packets continue to be exchanged with the TCP peer, the TOE's SYN and ACK values continue to change so, according to this embodiment, are periodically checkpointed. The greater the frequency of checkpointing, the better the possible recovery from a system failure.

Window size—Indicates how many bytes the peer will accept without acknowledgement. This value changes according to the peer's buffer usage so, rather than checkpoint this parameter, in the event of a fail-over it is merely assumed to have a value of 536 or 1460. If the peer has less buffer space for it to accept data, this will become apparent to Host 102 which will simply respond accordingly.
MSS—Max segment size indicates the max link-level packet size that can be used to send to the peer. This value can be stored after the initial connection so need not be periodically checkpoined, and merely restored at the time of fail-over.

Thus, after a fail-over, the TOE's SYN and ACK values are updated on the TCP/IP stack (of the formerly alternate, but now primary, TOE) for each connection. Hence the primary TOE 108 periodically checkpoints only these two parameters to the Host 102. Upon fail-over, if there is a difference between the TOE SYN and Peer ACK, Host 102 re-sends the difference data from its saved Send Buffers to the now primary (formerly alternate) TOE. Also, upon fail-over, if there is a difference between the Peer SYN and TOE ACK (as the Host's copy of the TOE ACK may not be synchronized at the time of failure of the former primary TOE), the now primary (formerly alternate) TOE sends the data to Host 102 from its saved Receive Buffers and deletes the same.

As a further optimization, the primary TOE 108 may not checkpoint the TOE's SYN value periodically, as the send buffer on the Host 102 can be used to calculate the new TOE's SYN, upon the failure of the primary TOE 108. This is simply the first SYN value plus the number of bytes sent on that connection by the Host 102. Host 102 receives the primary TOE's checkpointed SYN and knows the bytes sent on the connection, so Host 102 and the new TOE can compute the new TOE SYN and hence it need not be checkpointed.

Thus, in summary, the primary TOE 108 checkpoints the following parameters only once, after a connection is established:

TOE SYN value

Window size multiplier but periodically checkpoints the following parameters:

TOE ACK value

Peer ACK value (which eventually is not required to be "saved" in the Host 102, but is used to clear the send buffer at the Host 102).

Primary TOE 108 "piggybacks" the checkpoint parameters along with other packets, on the same connection, to the Host 102. This ensures that the checkpointing process has little if any computing or transmission overheads.

2. Internal Perspective—the TCP Stack

All the state information and data, as needed by the failed-over TCP stack, is updated and checkpointed. The following are possible parameters for checkpointing, for the failed-over TCP stack, for updating the internal structures:

As mentioned above, the Host 102 maintains the socket layer and several required parameters are available at the Host as well. The important information includes Src IP, Src Port, Dest IP, Dest Port and the TCP connection state. Since they are available from the Host, it is unnecessary to checkpoint or save these parameters.

Similarly, all the socket options (available with getsockopt( ) and ioctl( ) calls) are also available from the Host socket layer so do not need to be checkpointed or saved.

Hence no additional parameters need be checkpointed.

Checkpoint Mechanism

For each socket, all the parameters designated for checkpointing are updated to Host 102 periodically, using the same connectivity mechanism (112) that exists between Host 102 and primary TOE 108. The periodicity of checkpointing TOE ACK, Peer ACK is configurable, but is preferably more frequent than the other parameters require checkpointing.

For all the parameters only the latest value is important so, if there are unsent values existing within the primary TOE 108, when the next updated values are available the earlier values are overwritten and only the latest values are sent to Host 102. Parameter checkpoints of multiple sockets are clubbed together periodically, while sending to Host 102, to improve efficiency. As mentioned above, the parameters are piggybacked on other packets (from primary TOE to Host) being, on the same connection, to minimise overheads.

Send Buffer Handling

The TOE may fail after data is sent to peer 120 for a given connection from Host 102, such that the data will be in transit at failure (either in the TOE, or en route to the peer) and may be lost. For this reason, the Host 102 retains its send buffer until it receives an acknowledge from peer (which is communicated by the primary TOE 108 to Host 102, as the Peer's ACK value). This may not require additional send buffer space on the Host, but rather longer lead time before clearing the send buffer. This is similar to typical TCP/IP implementations in a single host, which clear their send buffer only after receiving an ACK. In the offload scenario of the present embodiment, an additional level of cascading is used.

Receive Buffer Handling

The primary TOE 108 may fail after data is received by the TOE for a given connection and an ACK has been sent back to the peer, but before the TOE has forwarded the data to the Host 102. Since the peer receives an ACK, peer clears its send buffer and the data sent by the peer is lost. To resolve this situation, the alternate TOE 110 continuously receives all the TCP packets on the ethernet port of the primary TOE 108.

The alternate TOE 110 maintains a circular buffer 118 of RECV buffer size for each TCP connection. The alternate TOE 110 retains data in the circular buffer 118, based on the ACK values seen from the TOE sent to peer. The circular buffer is indexed based on the peer's SYN value (or primary TOE's ACK value). Upon fail-over, the alternate TOE 108 checks whether there is any difference between the TOE's ACK value sent by the Host 102 and that stored in the alternate TOE. If there are no differences, no data has been lost, so circular buffer 118 is invalidated, and connections resume. If there any differences, data has been lost within the failed TOE, so alternate TOE resends the data from its circular buffer(s) to the Host 102 (as though a receive was done) and then updates the SYN and ACK values to the latest values. This ensures that no data is lost and that a reliable fail-over of TCP connections is performed.

Updating Linux Kernel TCP Structures

The following summarises the updating of the Linux Kernel TCP structures (on the alternate TOE) in the event of a fail-over:

The failure of the primary TOE 108 is identified and the Host 102 initiates a fail-over request.

A Linux Kernel module 116 is developed on the alternate TOE 110 to enable "insert" sockets and socket structures that reflect established sockets and TCP connections. For simplicity, only ESTABLISHED sockets (i.e. valid TCP connections) are considered for actual restoration in the fail-over. (Sockets in other states are straightforward to fail-over and migrate.)

The Linux Kernel module on the primary TOE 108 is configured to fetch the required parameters from the TCP structures, before the fail-over, so that they can be checkpointed.

The Linux Kernel module 116 on the alternate TOE 110 provides an "ioctl" interface (on a socket), which enables an application to provide details for socket "insertion".

The Linux Kernel module 116 on the alternate TOE 110 uses the "sock_create" Linux call (on the alternate TOE 110) to create a plain TCP socket, calls "inet_bind" to set-up port binding and finally makes customised changes to the socket structures ("struct socket", "struct sock", "struct inet sock" and "struct tcp_sock") to "install an established socket".

Impact Analysis

This section describes the effect of creating an established socket, including how these scenarios as encountered by the TCP peer. All these provide scenarios of a particular socket situation and the effect on a fail-over at that point in time.

The socket is in ESTABLISHED state, no data transfer has happened: No impact, smooth fail-over Data has been sent from Host 102 and received by the primary TOE 108, but not yet sent to TCP stack: No impact, as Host 102 will retry sending to the failed-over TOE.

Data has been sent from Host 102, sent to primary TOE's TCP stack, but the packet has not physically been sent out on the wire: Host will retry sending to the failed-over TOE (108). Since the packet has not been sent out on the wire, the TOE SYN has not changed and hence no problems should arise.

Data has been sent from Host 102 to peer 120, but no ACK has yet been received from the peer: This implies that TOE SYN has not been updated in the failed-over TOE, so the alternate TOE 110 sends it again (as the data in the Host's send buffer is still available). Re-packetization may occur and the peer will send a new ACK. No problem expected.

Data has been sent from Host 102, sent to peer 120, ACK received, but latest SYN and ACK not checkpointed: With the old SYN and ACK, re-packetization may occur. No problem expected.

Data received from the peer, but no ACK sent by primary TOE to the peer: After the fail-over, the peer will re-send the data upon receipt of an old ACK value.

Data received from peer, ACK sent to peer, latest SYN/ACK updated on Host: No problems, ideal case.

Data received from peer, ACK sent to peer, latest SYN/ACK not yet updated on Host 102: This means that the ACK was the old ACK value from the failed TOE and, since it has been sent, the peer may be expected to have removed the data from its send buffer. The TOE circular receive buffer described above resolves this problem, by resending the data to the Host 102. No problem arises.

Figure 2:
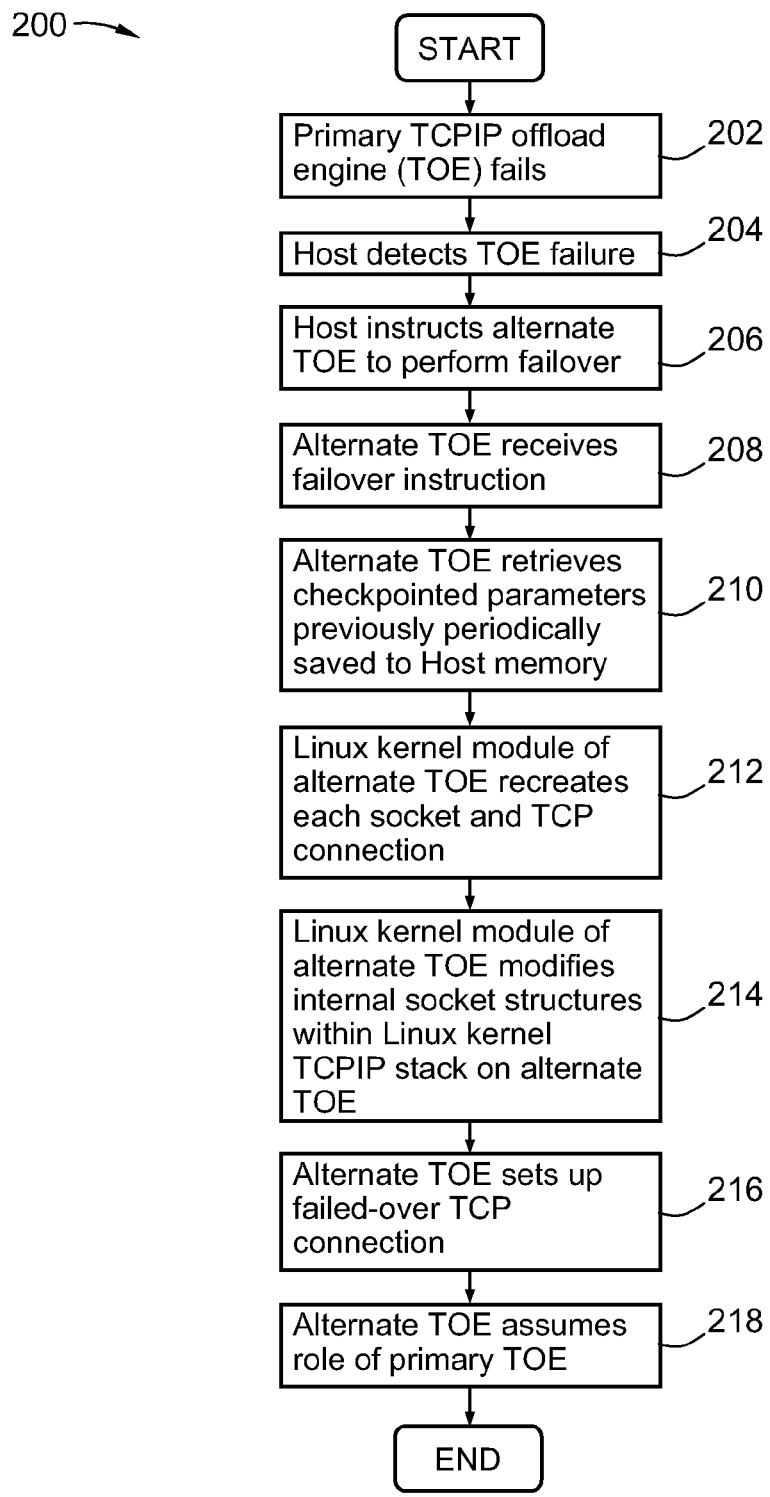
FIG. 2 is a flow diagram of the method for performing a fail-over following the failure of the primary TOE of the computing system of FIG. 1 according to an embodiment of the present invention.

FIG. 2 is a flow diagram 200 summarising the method for performing a fail-over following the failure of the primary TOE 108 of the computing system 100 of FIG. 1 according to an embodiment of the present invention. At step 202 the primary TOE 108 (viz. the current TOE) fails. At step 204, the Host 102 detects this failure and, at step 206, instructs alternate TOE 110 to perform a failover and thereby assume the role of TOE.

At step 208, alternate TOE 110 receives the failover instruction from Host 102 to perform the failover and, at step 210, alternate TOE 110 retrieves checkpointed parameters previously periodically saved to Host memory 106.

At step 212, the Linux kernel module 116 of the alternate TOE 110 recreates each socket and TCP connection. At step 214, Linux kernel module 116 of the alternate TOE 110 modifies the internal socket structures within the Linux kernel TCP/IP stack on alternate TOE 110.

At step 216 alternate TOE 110 sets up a failed-over TCP connection, and at step 218 the alternate TOE 110 assumes role of primary TOE 108. The failover procedure thus ends.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A computing system, comprising:
   a host computer system;
   a primary data packet communication protocol offload engine configured to act as an offload engine for said host computer system; and
   an alternate data packet communication protocol offload engine configured to act as an offload engine for said host computer system if said primary offload engine fails;
   wherein said host computer system, said primary offload engine and said alternate offload engine are in direct data communication and said primary and alternate offload engines communicate with one another via an external network on an ongoing basis prior to any failure of said primary offload engine, said primary offload engine is configured to save predefined data packet communication protocol parameters to said host computer system during normal operation, said alternate offload engine is configured to retrieve said predefined parameters from said host computer system if said primary offload engine fails; and
   wherein said alternate offload engine is configured to save all data packet communication protocol packets in a circular buffer sent by said primary offload engine to said host computer system as long as required for performing a reliable fail-over of data packet communication protocol connections.

2. A computing system as claimed in claim 1, wherein said data packet communication protocol is TCP/IP and said predefined parameters are TCP parameters.

3. A computing system as claimed in claim 1, wherein said alternate offload engine is configured to recreate each socket and data packet communication protocol connection of said primary offload engine if said primary offload engine fails.

4. A computing system as claimed in claim 1, wherein said data packet communication protocol is TCP/IP and said predefined parameters are TCP parameters that comprise a primary TCP/IP offload engine SYN value, a primary TCP/IP offload engine ACK value, a Window size multiplier and a peer ACK value.

5. A computing system as claimed in claim 4, wherein said primary offload engine is configured to periodically save said primary offload engine ACK value to said host computer system.

6. A computing system as claimed in claim 4, wherein said primary offload engine is configured to periodically save said peer ACK value at least initially.

7. A computing system as claimed in claim 1, wherein said primary offload engine is configured to forward said predefined parameters with other data packets to said host computer system.

8. A method for handling the failure of a primary data packet communication protocol offload engine of a host computer system, comprising:
   in response to failure of a primary data packet communication protocol offload engine, retrieving by an alternate data packet communication protocol offload engine predefined data packet communication protocol parameters previously periodically saved to said host computer system by said primary offload engine;

recreating each socket and data packet communication protocol connection of said primary offload engine by said alternate offload engine;

setting up a failed-over data packet communication protocol connection by said alternate offload engine;

in response to normal operation of said primary data packet communication protocol offload engine, saving by said alternate offload engine all data packet communication protocol packets in a circular buffer sent by said primary offload engine to said host computer system as long as required for performing a reliable fail-over of data packet communication protocol connections; and wherein said host computer system, said primary offload engine and said alternate offload engine are in direct data communication and said primary and alternate offload engines communicate with one another via an external network on an ongoing basis prior to any failure of said primary offload engine.

9. A method as claimed in claim 8, wherein said data packet communication protocol is TCP/IP and said predefined parameters are TCP parameters.

10. A method as claimed in claim 8, including receiving last received buffer information from said host computer system by said alternate offload engine and, upon receipt of said last received buffer information, deleting said packets saved by said alternate offload engine.

11. A method as claimed in claim 8, including modifying internal socket structures within a Linux kernel data packet communication protocol stack on said alternate offload engine by said alternate offload engine.

12. A non-transitory computer readable storage medium, having instructions stored thereon that, when executed, cause a computing system to perform a method for handling the failure of a primary data packet communication protocol offload engine of a host computer system, said method comprising:

in response to failure of a primary data packet communication protocol offload engine, retrieving by an alternate data packet communication protocol offload engine predefined data packet communication protocol parameters previously periodically saved to said host computer system by said primary offload engine;

recreating each socket and data packet communication protocol connection of said primary offload engine by said alternate offload engine; setting up a failed-over data packet communication protocol connection by said alternate offload engine;

in response to normal operation of said primary data packet communication protocol offload engine, saving by said alternate offload engine all data packet communication protocol packets in a circular buffer sent by said primary offload engine to said host computer system as long as required for performing a reliable fail-over of data packet communication protocol connections; and wherein said host computer system, said primary offload engine and said alternate offload engine are in direct data communication and said primary and alternate offload engines communicate with one another via an external network on an ongoing basis prior to any failure of said primary offload engine.

\* \* \* \* \*